(12) United States Patent
Sylvain et al.

(10) Patent No.: US 9,521,015 B2
(45) Date of Patent: Dec. 13, 2016

(54) DYNAMIC INSERTION OF A QUALITY ENHANCEMENT GATEWAY

(75) Inventors: Dany Sylvain, Gatineau (CA); Richard Charles Taylor, Manotick (CA)

(73) Assignee: GENBAND US LLC, Plano, TX (US)

( * ) Notice: Subject to any disclaimer, the term of this patent is extended or adjusted under 35 U.S.C. 154(b) by 1159 days.

(21) Appl. No.: 12/974,986

(22) Filed: Dec. 21, 2010

(65) Prior Publication Data
US 2012/0154506 A1 Jun. 21, 2012

(51) Int. Cl.
*H04L 12/66* (2006.01)
*H04L 29/06* (2006.01)
*H04M 7/12* (2006.01)

(52) U.S. Cl.
CPC .......... *H04L 12/66* (2013.01); *H04L 65/1016* (2013.01); *H04L 65/1069* (2013.01); *H04L 65/80* (2013.01); *H04M 7/1245* (2013.01)

(58) Field of Classification Search
USPC ............... 348/14.01, E07.078; 370/352, 401
See application file for complete search history.

(56) References Cited

U.S. PATENT DOCUMENTS

| | | | | |
|---|---|---|---|---|
| 4,680,797 A * | 7/1987 | Benke | ............... | G10L 25/00 704/211 |
| 6,131,012 A * | 10/2000 | Struhsaker | ............ | H04W 84/14 455/3.05 |
| 6,574,335 B1 * | 6/2003 | Kalmanek, Jr. | ... | H04M 3/42017 379/27.02 |
| 6,611,694 B1 * | 8/2003 | Oltedal | ............... | H04L 12/6418 370/351 |
| 6,614,781 B1 * | 9/2003 | Elliott | ................. | H04L 12/6418 370/352 |
| 7,151,772 B1 * | 12/2006 | Kalmanek, Jr. | ........ | H04L 49/201 370/390 |
| 7,450,570 B1 * | 11/2008 | Barzegar | ................. | H04L 12/66 370/352 |
| 7,496,192 B1 * | 2/2009 | Sylvain | ............... | H04M 7/0027 370/352 |
| 7,599,356 B1 * | 10/2009 | Barzegar | ........... | H04M 3/42314 370/259 |
| 7,606,914 B2 * | 10/2009 | Ikeda et al. | .................... | 709/228 |
| 8,228,861 B1 * | 7/2012 | Nix | ........................ | H04W 36/00 370/329 |
| 2001/0005372 A1 * | 6/2001 | Cave | ....................... | H04L 29/06 370/401 |
| 2002/0001302 A1 * | 1/2002 | Pickett | ................ | H04L 12/2856 370/352 |
| 2003/0088619 A1 * | 5/2003 | Boundy | .................. | H04L 29/06 709/204 |

(Continued)

*Primary Examiner* — Duc Nguyen
*Assistant Examiner* — Yogeshkumar Patel
(74) *Attorney, Agent, or Firm* — Fogarty, L.L.C.

(57) ABSTRACT

Methods, systems, and computer readable media for enhancing media quality by dynamically inserting a quality enhancement gateway are disclosed. According to one method, steps are performed at a service node. The method includes detecting a condition associated with a session between two endpoints that indicates that the session could benefit from media quality enhancement processing. The method also includes signaling the endpoints to route at least a portion of the session through a quality enhancement gateway (QEG) capable of providing the media quality enhancement processing for the session.

24 Claims, 10 Drawing Sheets

(56) References Cited

U.S. PATENT DOCUMENTS

| | | | |
|---|---|---|---|
| 2003/0231594 A1* | 12/2003 | Xu | H04L 1/1877 370/236 |
| 2004/0001479 A1* | 1/2004 | Pounds | H04L 12/66 370/352 |
| 2004/0001501 A1* | 1/2004 | Delveaux | H04L 12/4625 370/442 |
| 2004/0001579 A1* | 1/2004 | Feinberg | H04M 3/60 379/156 |
| 2006/0089998 A1* | 4/2006 | Kim | H04L 29/06027 709/229 |
| 2006/0227766 A1* | 10/2006 | Mickle | H04L 29/06027 370/356 |
| 2006/0256748 A1* | 11/2006 | Jung | H04L 65/103 370/328 |
| 2007/0049314 A1* | 3/2007 | Balachandran | H04W 4/10 455/518 |
| 2007/0121587 A1* | 5/2007 | Mundra et al. | 370/352 |
| 2007/0206568 A1* | 9/2007 | Silver | H04L 12/66 370/352 |
| 2007/0206571 A1* | 9/2007 | Silver | H04W 4/16 370/352 |
| 2007/0206572 A1* | 9/2007 | Silver | H04L 65/103 370/352 |
| 2007/0206573 A1* | 9/2007 | Silver | H04W 76/022 370/352 |
| 2008/0146208 A1* | 6/2008 | Ejzak | H04L 12/66 455/416 |
| 2008/0244148 A1* | 10/2008 | Nix, Jr. | H04L 41/0856 710/313 |
| 2009/0003231 A1* | 1/2009 | Hawbaker | H04L 45/00 370/252 |
| 2009/0059818 A1* | 3/2009 | Pickett | H04L 12/2856 370/259 |
| 2009/0103450 A1* | 4/2009 | Peisa | H04L 1/0002 370/253 |
| 2009/0238085 A1* | 9/2009 | Khanduri | H04L 41/5009 370/252 |
| 2009/0245272 A1* | 10/2009 | Peisa | H04L 1/1812 370/428 |
| 2009/0252153 A1* | 10/2009 | Choi | H04M 3/42017 370/352 |
| 2009/0285175 A1* | 11/2009 | Nix | H04L 29/125 370/331 |
| 2009/0290542 A1* | 11/2009 | Luo | H04W 8/26 370/328 |
| 2009/0299742 A1* | 12/2009 | Toman et al. | 704/233 |
| 2009/0323632 A1* | 12/2009 | Nix | H04L 29/125 370/331 |
| 2010/0034082 A1* | 2/2010 | Ikeda | H04L 47/20 370/230 |
| 2010/0182921 A1* | 7/2010 | Basart | H04M 7/0057 370/252 |
| 2010/0191525 A1* | 7/2010 | Rabenko | H04B 3/23 704/211 |
| 2011/0122777 A1* | 5/2011 | Matten | H04W 12/02 370/252 |
| 2011/0252141 A1* | 10/2011 | Boberg | H04L 67/24 709/226 |
| 2012/0054809 A1* | 3/2012 | Chowdhury | H04N 21/2223 725/93 |
| 2012/0076287 A1* | 3/2012 | Ramalingam | H04B 3/23 379/202.01 |

\* cited by examiner

DYNAMIC INSERTION OF A QUALITY ENHANCEMENT GATEWAY

TECHNICAL FIELD

The subject matter described herein relates to enhancing media quality by dynamically inserting a quality enhancement gateway. More specifically, the subject matter described herein relates to methods, systems, and computer readable media for enhancing media quality by dynamically inserting a quality enhancement gateway.

BACKGROUND

As telecommunications technology evolves, users frequently seek to establish communication sessions between themselves and other users who have differing media quality capabilities. While media quality enhancement technologies exist to enable users to communicate with other users having differing media quality capabilities, a problem arises as to where to physically and logically locate these media quality enhancement technologies. Locating media quality enhancement technology within user equipment itself or in a local media gateway that serves as a bridge between user equipment and the network limits the media quality enhancement capabilities available to those that are known at the time the user equipment or local media gateway is manufactured and/or necessities ongoing upgrades. On the other hand, locating media quality enhancement technology within a provider's existing network hardware is likely to be prohibitively expensive due to the relative cost of media quality enhancement technology in relation to the overall cost of a provider's infrastructure. In light of these realities, media quality enhancement technology is seldom adopted on a large scale until after a technology has become ubiquitous. Often, however, it is in the beginning of a media quality enhancement technology's lifecycle, when users are likely to have differing media quality capabilities, that it is most valuable. As a technology becomes more pervasive, more and more users will have the required capability and no longer require media quality enhancement.

Accordingly, a need exists for improved methods, systems, and computer readable media for enhancing media quality by dynamically inserting a quality enhancement gateway.

SUMMARY

Methods, systems, and computer readable media for enhancing media quality by dynamically inserting a quality enhancement gateway are disclosed. According to one method, steps are performed at a service node. The method includes detecting a condition associated with a session between two endpoints that indicates that the session could benefit from media quality enhancement processing. The method also includes signaling the endpoints to route at least a portion of the session through a quality enhancement gateway (QEG) capable of providing the media quality enhancement processing for the session.

A system for enhancing media quality by dynamically inserting a quality enhancement gateway is also disclosed. The system includes a network interface for sending and receiving messages associated with a session. The system also includes a detection module for detecting a condition associated with a session between two endpoints that indicates that the session could benefit from media quality enhancement processing. The system also includes a signaling module for signaling the endpoints to route at least a portion of the session through a quality enhancement gateway (QEG) capable of providing the media quality enhancement processing for the session.

The subject matter described herein may be implemented in hardware, a combination of hardware and software, firmware, or any combination of hardware, software, and firmware. As such, the terms "function" or "module" as used herein refer to hardware, a combination of hardware and software, firmware, or any combination of hardware, software, and firmware for implementing the features described herein. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for enhancing media quality by dynamically inserting a quality enhancement gateway. In one embodiment, a service node detects a condition associated with a session between two endpoints that indicates that the session could benefit from media quality enhancement processing. The service node may be a stand-alone node or the service node may be a component of a call server/softswitch. The service node may be configured to operate in a network in which the session originates, terminates, or neither originates nor terminates. The service node may be configured as an Internet protocol multimedia subsystem (IMS) application server (AS), a media resource function controller (MRFC), or a call session control function (CSCF).

Detecting a condition that could benefit from media quality enhancement processing may include inspecting session description protocol (SDP) parameters, detecting a session between a narrowband voice endpoint and a wideband voice endpoint, detecting a session between a narrowband or wideband voice endpoint and a super-wideband voice endpoint, detecting a session with a wireless endpoint, detecting a session between an endpoint and an endpoint using a lower quality video codec, or detecting a session between a two-dimensional (2D) video endpoint and a three-dimensional (3D) video endpoint. A narrowband endpoint may include a G.711, G.726, G.729, adaptive multi-rate (AMR), or enhanced variable rate codec (EVRC) codec. A wideband endpoint may include a G.722, G.722.2, or G.729.1 codec.

In one embodiment, the service node may detect the condition, for example, a codec associated with the session may indicate the session could benefit from media quality enhancement processing. In another embodiment, a lookup of a number associated with one of the endpoints may indicate the session could benefit from media quality enhancement processing. In other embodiments, an endpoint may signal the service node so as to indicate that the session could benefit from media quality enhancement processing, or a policy may indicate that the session could benefit from media quality enhancement processing and further dictate what if any signaling should be performed. Relevant policies might include: network policies, user policies, user-configuration policies, session-specific policies, route-specific policies, and media-specific policies.

The service node signals the endpoints to route at least a portion of the session through a quality enhancement gateway (QEG) capable of providing the media quality enhancement processing for the session. The portion of the session routed through the QEG may be one-way media, bi-directional media, audio only media, video only media, or audio/video media. QEG may be capable of providing various types of media quality enhancement processing, including: voice expansion from narrowband to wideband, voice expansion for narrowband to super-wideband, voice expansion from wideband to super-wideband, background noise reduction, echo cancellation, video blocking reduction, video frame interpolation, video line interpolation, video motion interpolation, or two-dimensional (2D) video to three-dimensional (3D) video simulation. The signaling may comprise session initiation protocol (SIP) signaling or extensible messaging and presence protocol (XMPP) signaling.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
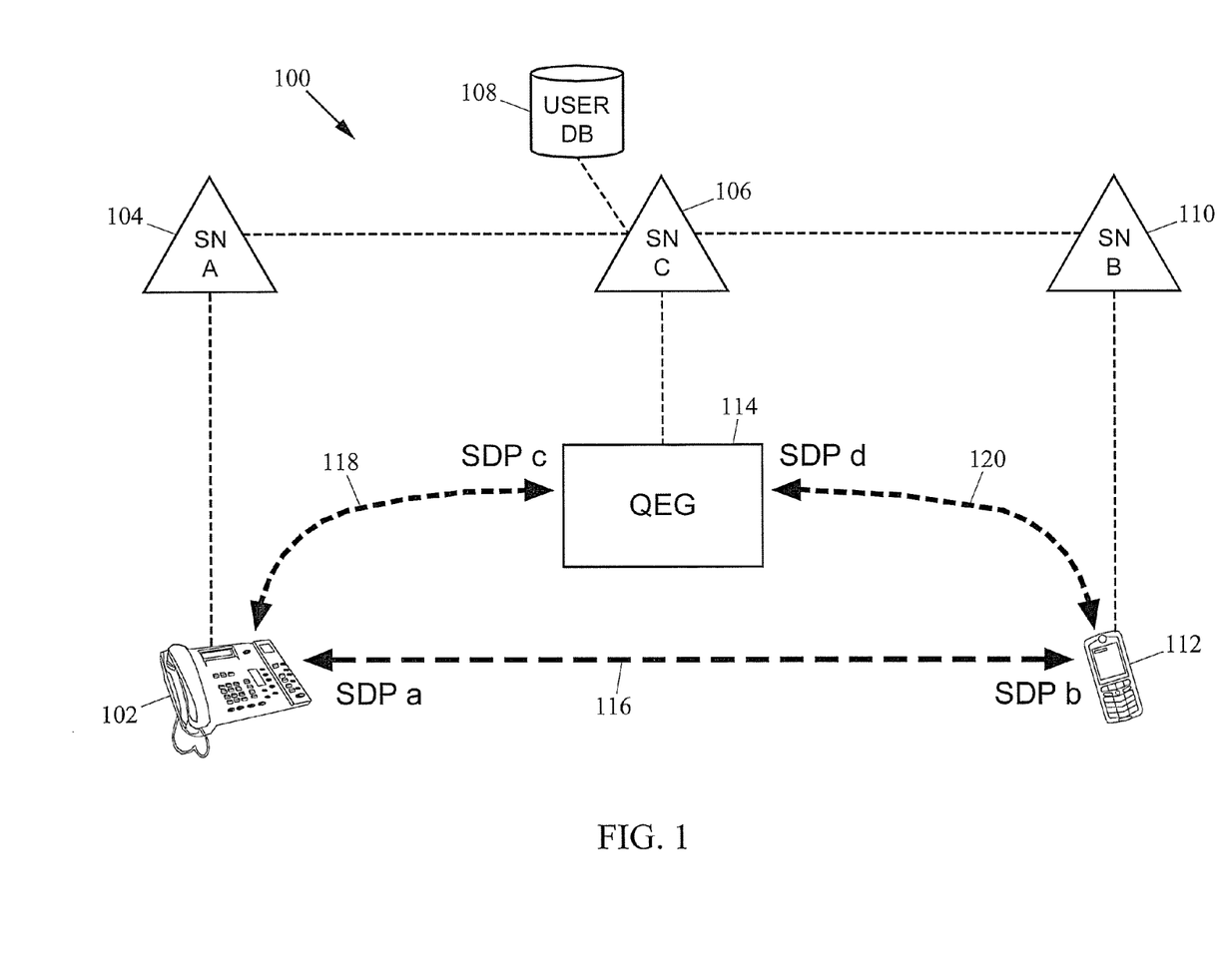
FIG. 1 is a network diagram illustrating an exemplary network for enhancing media quality by dynamically inserting a quality enhancement gateway according to an embodiment of the subject matter described herein.

FIG. 1 is a network diagram illustrating an exemplary network for enhancing media quality by dynamically inserting a quality enhancement gateway according to an embodiment of the subject matter described herein. Referring to FIG. 1, network 100 may include user equipment (UE) 102 and UE 112. UE 102 and UE 112 may be, for example, a traditional phone, a mobile phone, a smartphone, a voice over Internet protocol (VoIP) phone, a computing device running a softphone application, a video phone, or another device through which a subscriber accesses network services. In network 100, for example, UE 102 is a VoIP phone and UE 112 is a mobile phone. UE 102 and UE 112 may be associated with network subscribers. Network 100 further includes at least one service node (SN). For example, network 100 includes SN 104, SN 106, and SN 110. A SN may have access to a user database, for example, in network 100, SN 106 has access to user database 108. Network 100 further includes quality enhancement gateway (QEG) 114. Network 100 may enable establishment of a bearer path 116 for a session between UE 102 and UE 112. In accordance with the subject matter disclosed herein, media quality may be enhanced between UE 102 and UE 112 by dynamically inserting QEG 114. Dynamically inserting QEG 114 forms bearer path 118 and bearer path 120, routing at least a portion of the session between UE 102 and UE 112 through QEG 114.

Figure 2:
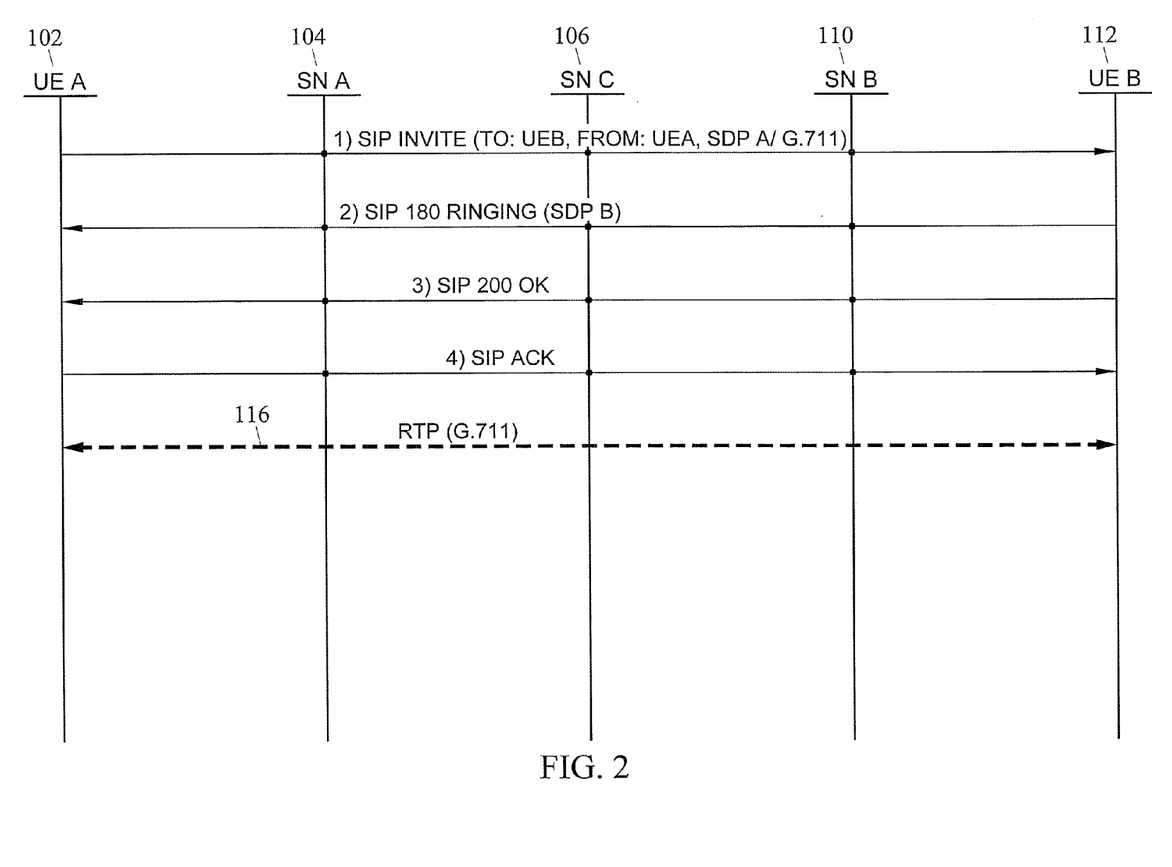
FIG. 2 is a message flow diagram illustrating establishment of a bearer path for a standard voice call (i.e., no QEG insertion)

FIG. 2 is a message flow diagram illustrating establishment of a bearer path for a standard voice call (i.e., no QEG insertion). Referring to FIG. 2, at step 1, UE A 102 sends to UE B 112, by way of SN A 104, SN C 106, and SN B 110, a SIP INVITE message having session description protocol (SDP) "a" specifying G.711 codec. At step 2, UE B 112 sends to UE A 102, by way of SN B 110, SN C 106, and SN A 104, a SIP 180 Ringing message having SDP "b." At step 3, UE B 112 sends to UE A 102, by way of SN B 110, SN C 106, and SN A 104, a SIP 200 OK message. At step 4, UE A 102 sends to UE B 112, by way of SN A 104, SN C 206, and SN B 110, a SIP acknowledge (ACK) message, resulting in a real-time transport protocol (RTP) bearer path 116 for a session using G.711 codec between UE A 102 and UE B 112.

Figure 3:
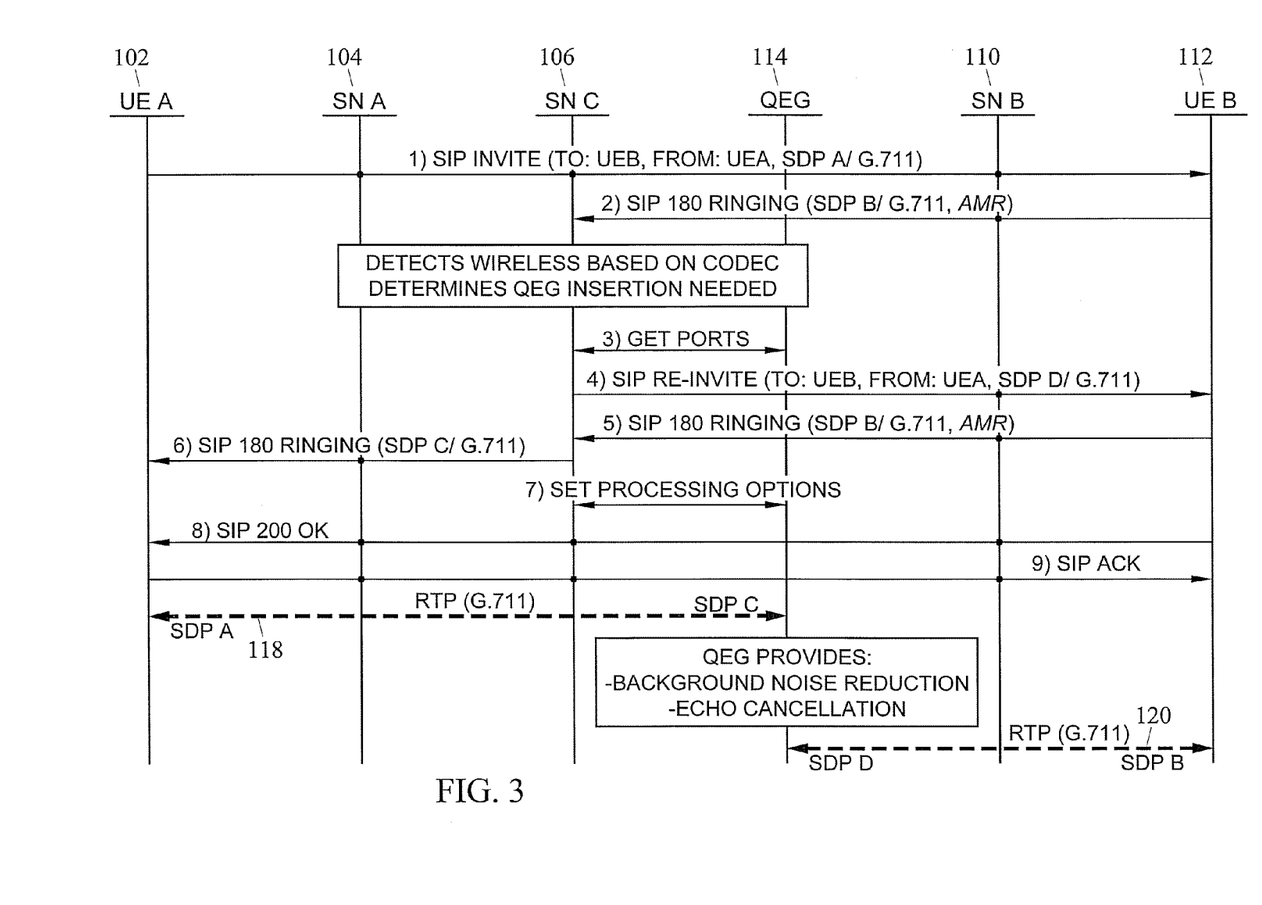
FIG. 3 is a message flow diagram illustrating dynamic insertion of a quality enhancement gateway in response to a service node determining that a session could benefit from quality enhancement processing based on a codec according to an embodiment of the subject matter described herein.

FIG. 3 is a message flow diagram illustrating dynamic insertion of a quality enhancement gateway in response to a service node determining that a session could benefit from quality enhancement processing based on a codec according to an embodiment of the subject matter described herein. Referring to FIG. 3, at step 1, UE A 102 sends to UE B 112, by way of SN A 104, SN C 106, and SN B 110, a SIP INVITE message having SDP "a" specifying G.711 codec. At step 2, UE B 112 sends to UE A 102, by way of SN B 110, SN C 106, and SN A 104, a SIP 180 Ringing message having SDP "b" specifying G.711 or AMR codecs.

As the SIP 180 Ringing message passes through SN C 106, SN C 106 detects, based on the codec, that UE B 112 is a wireless endpoint and determines that a session between UE B 112 and UE A 102 could benefit from background noise reduction and echo cancellation. At step 3, SN C 106 signals QEG 114 to obtain the port information required to route a session between UE A 102 and UE B 112 through QEG 114. QEG 114 signals to SN C 106 to use SDP "c" to establish a session between UE A 102 and QEG 114, and to use SDP "d" to establish a session between UE B 112 and QEG 114. At step 4, SN C 106 sends to UE B 112, by way of SN B 110, a SIP re-INVITE message having SDP "d" specifying G.711 codec. At step 5, UE B 112 sends to SN C 106, by way of SN B 110, a SIP 180 Ringing message having SDP "b" specifying G.711 or AMR codecs. At step 6, SN C 106 sends a SIP 180 Ringing message to UE A 102, by way of SN A 104, having SDP "c" specifying G.711 codec. At step 7, SN C 106 signals QEG 114 to set processing options for the session to be established between UE A 102 and UE B 112. At step 8, UE B 112 sends to UE A 102, by way of SN B 110, SN C 106, and SN A 104, a SIP 200 OK message. At step 9, UE A 102 sends to UE B 112, by way of SN A 104, SN C 106, and SN B 110, a SIP ACK message, resulting in an RTP bearer path 118 for a session using G.711 codec between UE A 102 and QEG 114, as well as an RTP bearer path 120 for a session using G.711 codec between QEG 114 and UE B 112. QEG 114 provides background noise reduction and echo cancellation processing.

Figure 4:
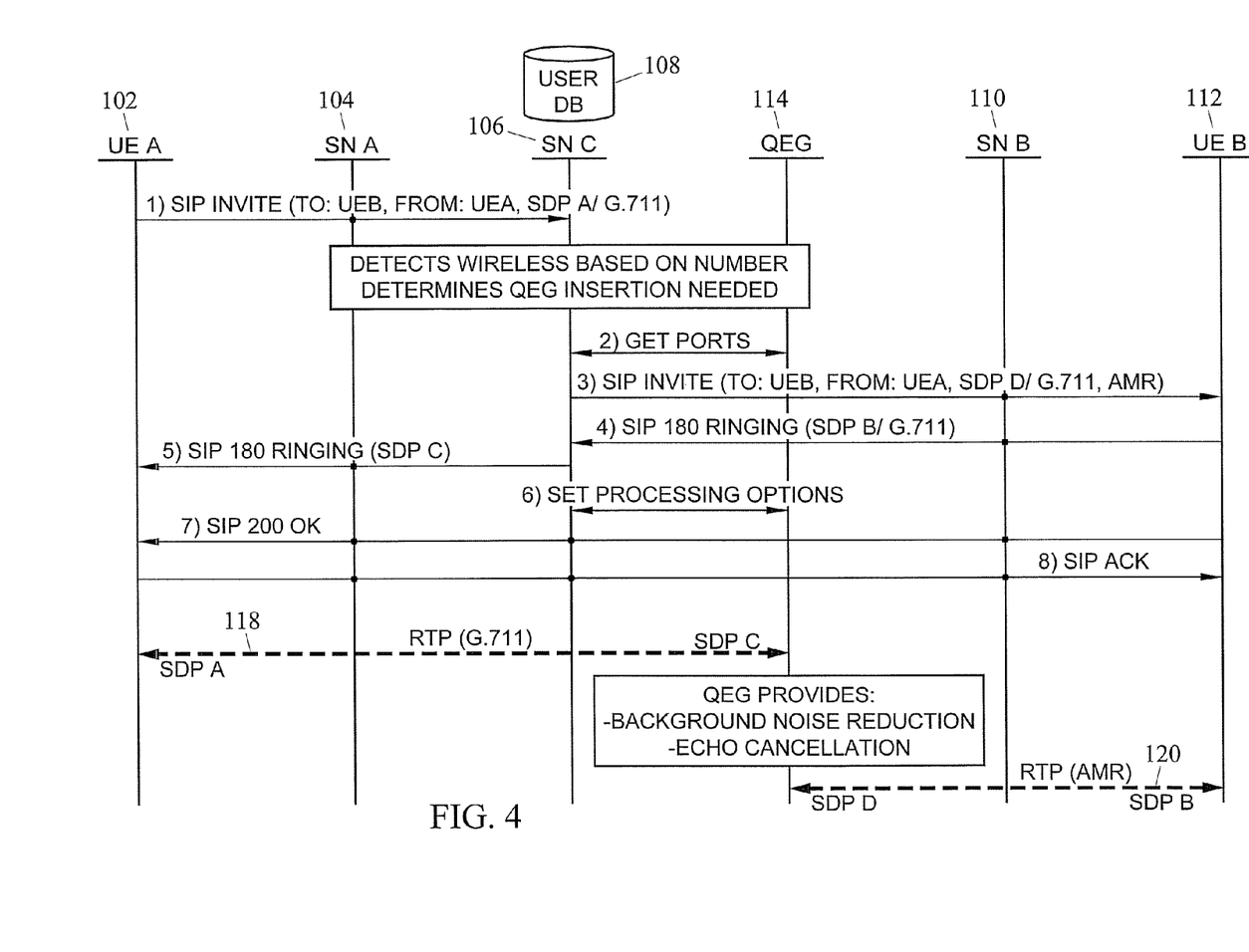
FIG. 4 is a message flow diagram illustrating dynamic insertion of a quality enhancement gateway in response to a service node determining that a session could benefit from quality enhancement processing based on a number associated with an endpoint according to an embodiment of the subject matter described herein.

FIG. 4 is a message flow diagram illustrating dynamic insertion of a quality enhancement gateway in response to a service node determining that a session could benefit from quality enhancement processing based on a number associated with an endpoint according to an embodiment of the subject matter described herein. Referring to FIG. 4, at step 1, UE A 102 sends to UE B 112, by way of SN A 104, SN C 106, and SN B 110, a SIP INVITE message having SDP "a" specifying G.711 codec. As the SIP INVITE message passes through SN C 106, SN C 106 utilizes user database 108 to detect, based on the number, that UE B 112 is a wireless endpoint and determines that a session between UE B 112 and UE A 102 could benefit from background noise reduction and echo cancellation.

At step 2, SN C 106 signals QEG 114 to obtain the port information required to route a session between UE A 102 and UE B 112 through QEG 114. QEG 114 signals to SN C 106 to use SDP "c" to establish a session between UE A 102 and QEG 114, and to use SDP "d" to establish a session between UE B 112 and QEG 114. At step 3, SN C 106 sends a SIP INVITE message to UE B 112, by way of SN B 110, having SDP "d" specifying G.711 and AMR codecs. At step 4, UE B 112 sends to SN C 106, by way of SN B 110, a SIP 180 Ringing message having SDP "b" specifying G.711 codec. At step 5, SN C 106 sends to UE A 102, by way of SN A 104, a SIP Ringing message having SDP "c." At step 6, SN C 106 signals QEG 114 to set processing options for the session to be established between UE A 102 and UE B 112. At step 7, UE B 112 sends to UE A 102, by way of SN B 110, SN C 106, and SN A 104, a SIP 200 OK message. At step 8, UE A 102 sends to UE B 112, by way of SN A 104, SN A 106, and SN B 110, a SIP ACK message, resulting in an RTP bearer path 118 for a session using G.711 codec between UE A 102 and QEG 114, as well as an RTP bearer path 120 for a session using AMR codec between QEG 114 and UE B 112. QEG 114 provides background noise reduction and echo cancellation processing.

Figure 5:
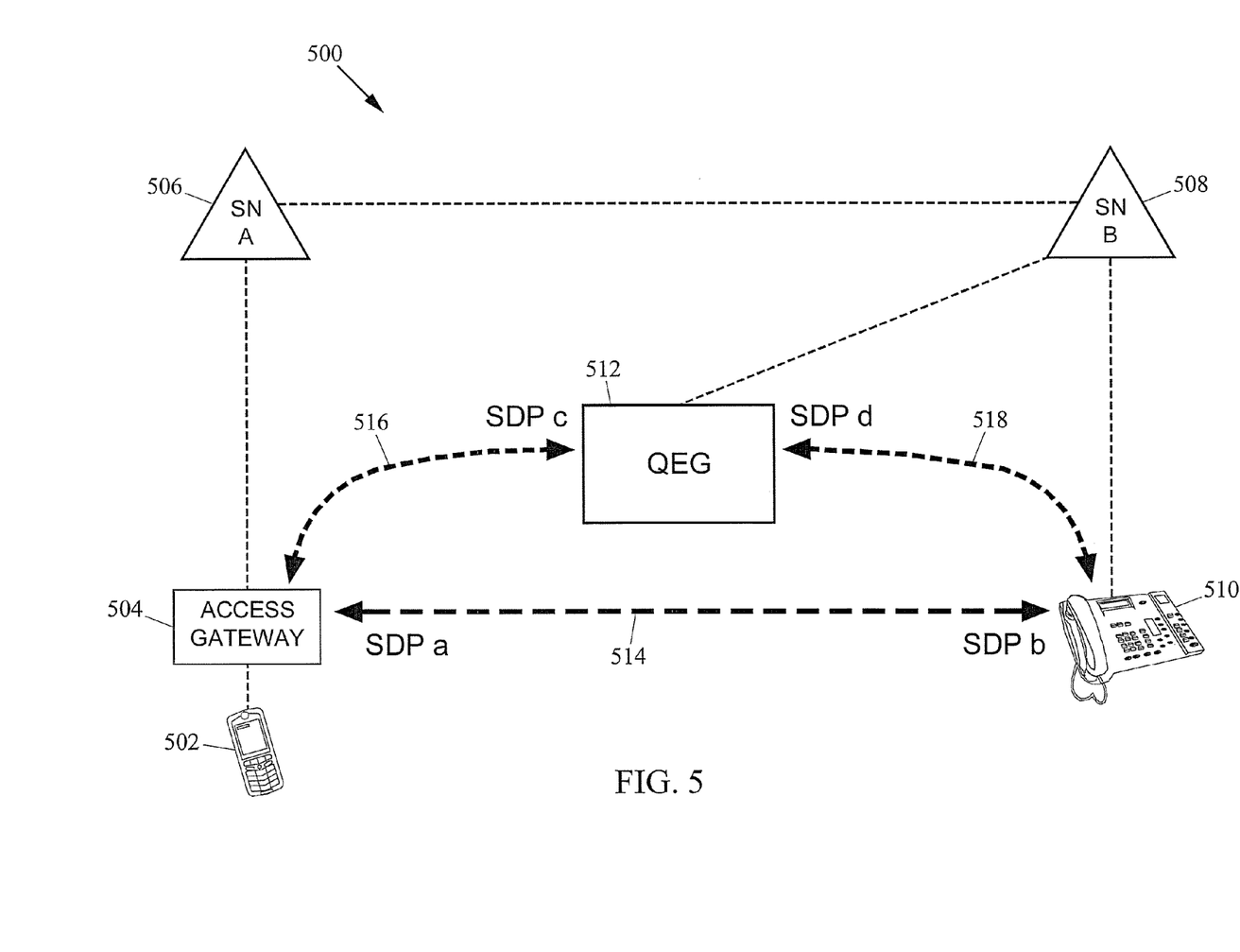
FIG. 5 is a network diagram illustrating an exemplary network for enhancing media quality by dynamically inserting a quality enhancement gateway to provide artificial wideband processing according to an embodiment of the subject matter described herein.

FIG. 5 is a network diagram illustrating an exemplary network for enhancing media quality by dynamically inserting a quality enhancement gateway to provide artificial wideband processing according to an embodiment of the subject matter described herein. Referring to FIG. 5, network 500 may include UE 502 and UE 510. UE 502 and UE 510 may be, for example, a traditional phone, a mobile phone, a smartphone, a VoIP phone, a computing device running a softphone application, a video phone, or another device through which a subscriber accesses network services. In network 500, for example, UE 510 is a VoIP phone and UE 502 is a mobile phone. UE 502 and UE 510 may be associated with network subscribers. UE 502 may connect to network 500 via access gateway 504. Network 500 further includes SN 506, SN 508, and QEG 512. Network 500 may enable establishment of a bearer path 514 for a session between UE 502 and UE 510. In accordance with the subject matter disclosed herein, media quality may be enhanced between UE 502 and UE 510 by dynamically inserting QEG 512. Dynamically inserting QEG 512 forms bearer path 516 and bearer path 518, routing at least a portion of the session between UE 502 and UE 510 through QEG 512.

Figure 6:
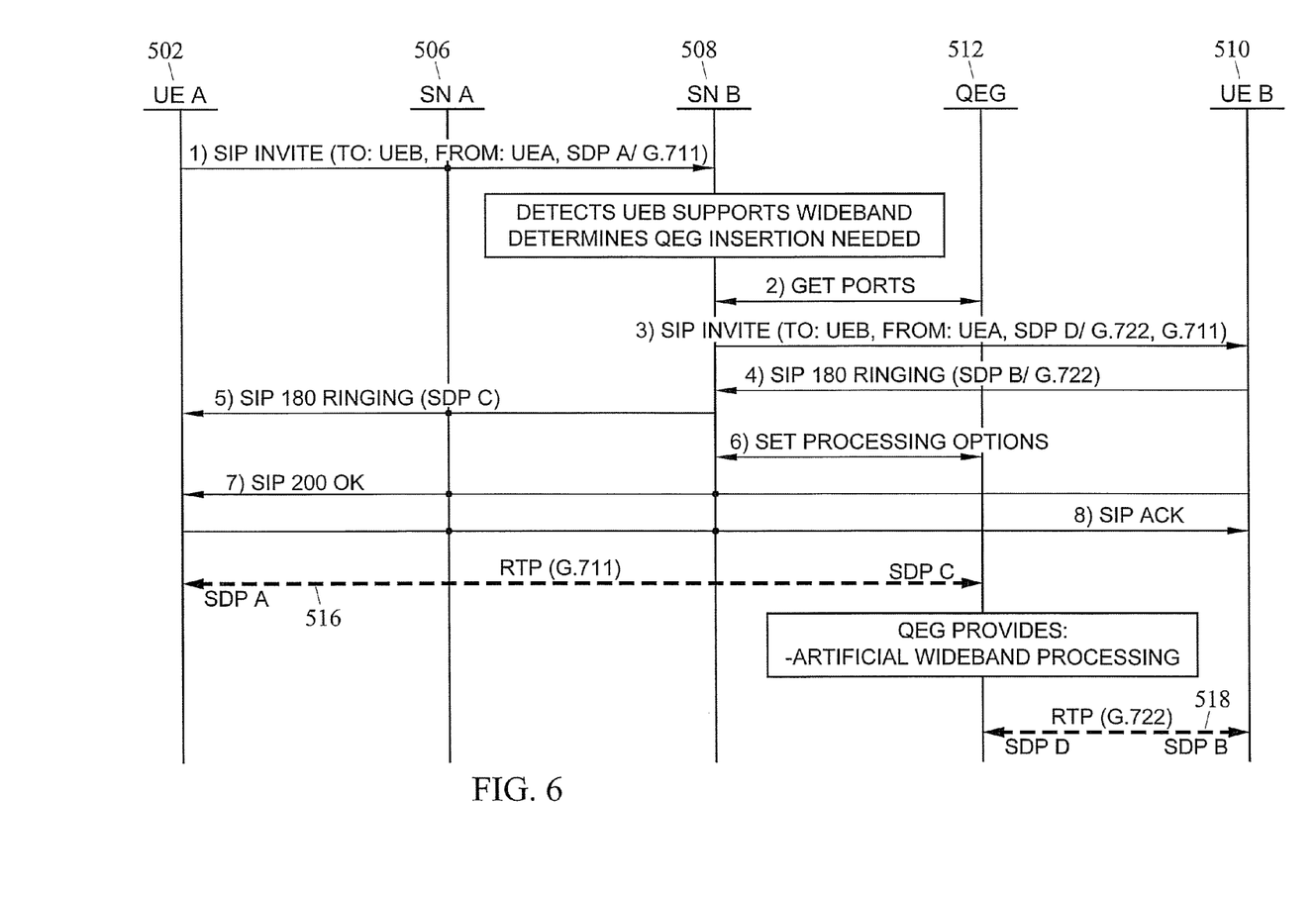
FIG. 6 is a message flow diagram illustrating establishment of a bearer path for a call in which a quality enhancement gateway is inserted to provide artificial wideband processing according to an embodiment of the subject matter described herein.

FIG. 6 is a message flow diagram illustrating establishment of a bearer path for a call in which a quality enhancement gateway is inserted to provide artificial wideband processing according to an embodiment of the subject matter described herein. Referring to FIG. 6, at step 1, UE A 502 sends to UE B 510, by way of SN A 506 and SN B 508, a SIP INVITE message having SDP "a" specifying G.711 codec. As the SIP INVITE message passes through SN B 508, SN B 508 detects that UE B 510 supports wideband and determines that a session between UE B 510 and UE A 502 could benefit from artificial wideband processing. For example, SN B 508 may detect that UE B 510 supports wideband by looking up a profile associated with UE B 510 that is stored on SN B 508.

At step 2, SN B 508 signals QEG 512 to obtain the port information required to route a session between UE A 502 and UE B 510 through QEG 512. QEG 512 signals to SN B 508 to use SDP "c" to establish a session between UE A 502 and QEG 512, and to use SDP "d" to establish a session between UE B 510 and QEG 512. At step 3, SN B 508 sends a SIP INVITE message to UE B 510 having SDP "d" specifying G.722 and G.711 codecs. At step 4, UE B 510 sends to SN B 508 a SIP 180 Ringing message having SDP "b" specifying G.722 codec. At step 5, SN B 510 sends to UE A 502, by way of SN A 506, a SIP Ringing message having SDP "c." At step 6, SN B 508 signals QEG 512 to set processing options for the session to be established between UE A 502 and UE B 510. At step 7, UE B 510 sends to UE A 502, by way of SN B 508 and SN A 506, a SIP 200 OK message. At step 8, UE A 502 sends to UE B 510, by way of SN A 506 and SN B 508, a SIP ACK message, resulting in an RTP bearer path 516 for a session using G.711 codec between UE A 502 and QEG 512, as well as an RTP bearer path 518 for a session using G.722 codec between QEG 512 and UE B 510. QEG 512 provides artificial wideband processing.

Figure 7:
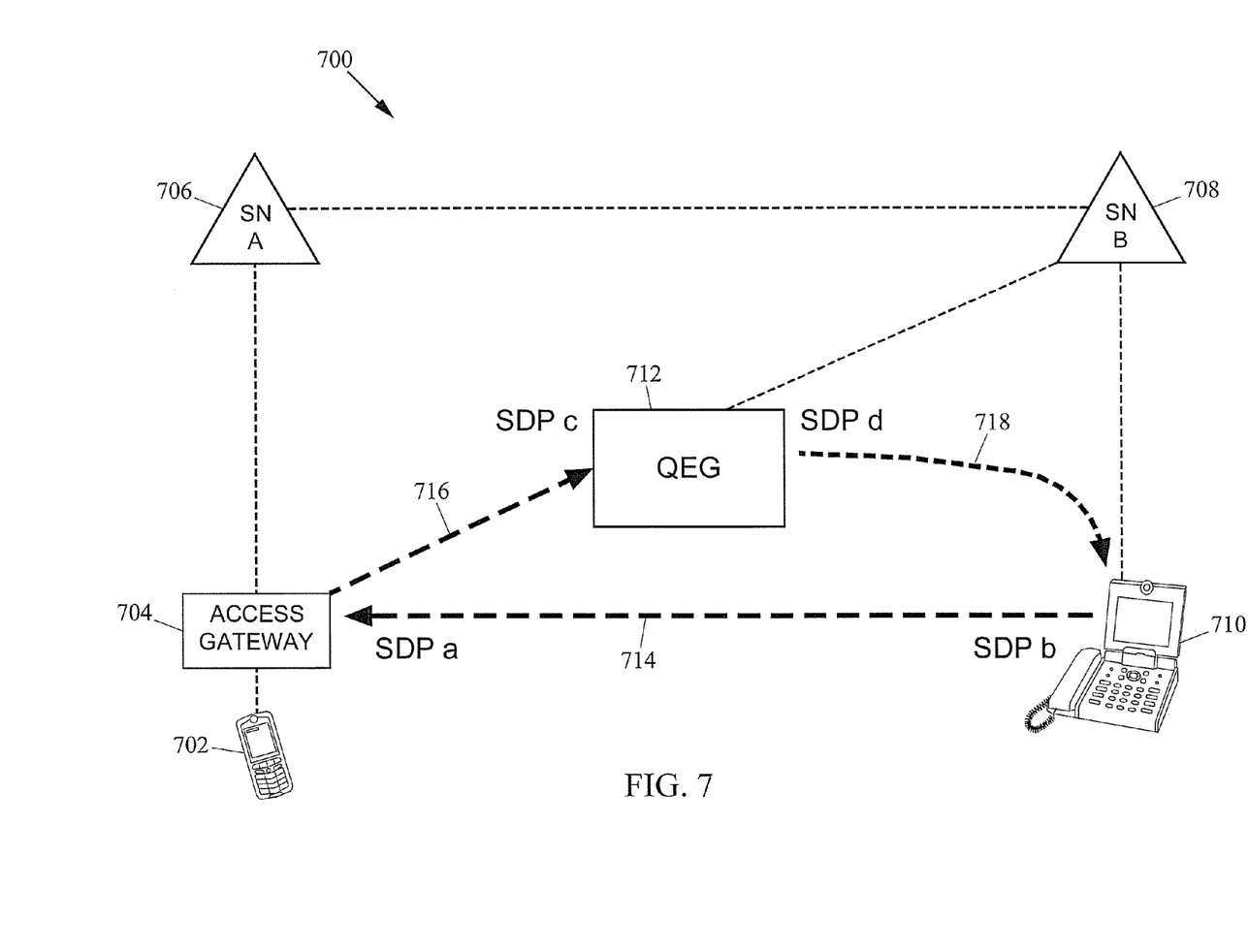
FIG. 7 is a network diagram illustrating an exemplary network for enhancing media quality for a video call by dynamically inserting a quality enhancement gateway according to an embodiment of the subject matter described herein.

FIG. 7 is a network diagram illustrating an exemplary network for enhancing media quality for a video call by dynamically inserting a quality enhancement gateway according to an embodiment of the subject matter described herein. Referring to FIG. 7, network 700 may include UE 702 and UE 710. UE 702 and UE 710 may be, for example, a traditional phone, a mobile phone, a smartphone, a VoIP phone, a computing device running a softphone application, a video phone, or another device through which a subscriber accesses network services. In network 700, for example, UE 710 is a video phone and UE 702 is a mobile phone. UE 702 and UE 710 may be associated with network subscribers. UE 702 may connect to network 700 via access gateway 704. Network 700 further includes SN 706, SN 708, and QEG 712. Network 700 may enable establishment of a bearer path 714 for at least a portion of a session between UE 702 and UE 710. In accordance with the subject matter disclosed herein, media quality may be enhanced between UE 702 and UE 710 by dynamically inserting QEG 712. Dynamically inserting QEG 712 forms bearer path 716 and bearer path 718, routing at least a portion of the session between UE 702 and UE 710 through QEG 712.

Figure 8:
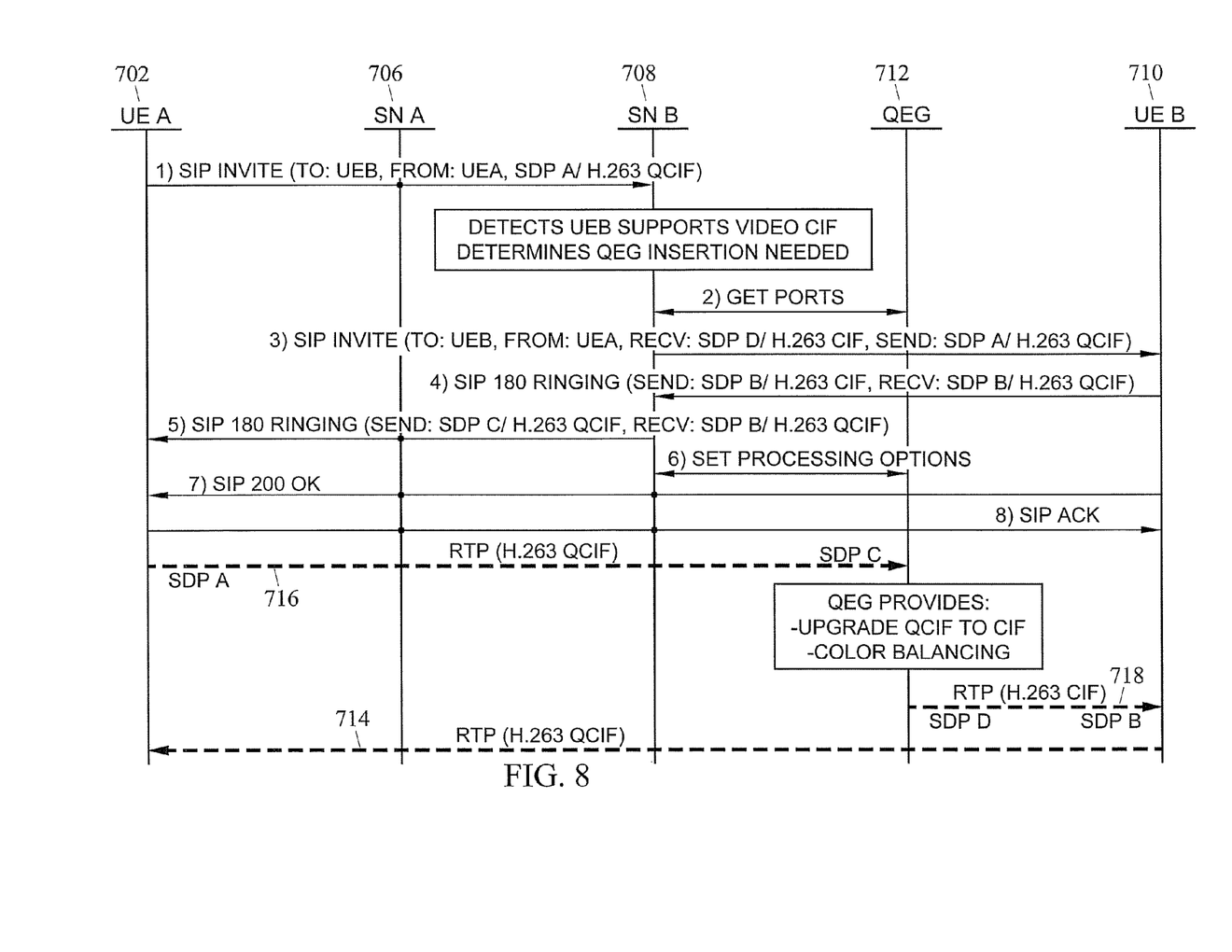
FIG. 8 is a message flow diagram illustrating establishment of a bearer path for a video call in which a quality enhancement gateway is inserted according to an embodiment of the subject matter described herein.

FIG. 8 is a message flow diagram illustrating establishment of a bearer path for a video call in which a quality enhancement gateway is inserted according to an embodiment of the subject matter described herein. Referring to FIG. 8, at step 1, UE A 702 sends to UE B 710, by way of SN A 706 and SN B 708, a SIP INVITE message having SDP "a" specifying H.263 quarter common intermediate format (QCIF) codec for video. As the SIP INVITE message passes through SN B 708, SN B 708 detects that UE B 710 supports common intermediate format (CIF) video and determines that a session between UE B 710 and UE A 702 could benefit from processing to color balance and upgrade the QCIF video produced by UE A 702 to CIF video for display by UE B 710.

At step 2, SN B 708 signals QEG 712 to obtain the port information required to route the video portion of the session between UE A 702 and UE B 710 to be upgraded through QEG 712. QEG 712 signals to SN B 708 to use SDP "c" to establish a session between UE A 702 and QEG 712, and to use SDP "d" to establish a session between UE B 710 and QEG 712. At step 3, SN B 708 sends a SIP INVITE message to UE B 710 having SDP "d" specifying H.263 CIF codec for receiving video and SDP "a" specifying H.263 QCIF codec for sending video. At step 4, UE B 710 sends to SN B 708 a SIP 180 Ringing message having SDP "b" specifying H.263 CIF codec for sending video and H.263 QCIF codec for receiving video. At step 5, SN B 708 sends to UE A 702, by way of SN A 706, a SIP Ringing message having SDP "c" specifying H.263 QCIF codec for sending video and SDP "b" specifying H.263 QCIF codec for receiving video. At step 6, SN B 708 signals QEG 712 to set processing options for the session to be established between UE A 702 and UE B 710. At step 7, UE B 710 sends to UE A 702, by way of SN B 708 and SN A 706, a SIP 200 OK message. At step 8, UE A 702 sends to UE B 710, by way of SN A 706 and SN B 708, a SIP ACK message, resulting in: an RTP bearer path 714, originating at UE B 710 and terminating at UE A 702, for H.263 QCIF codec video; an RTP bearer path 716, originating at UE A 702 and terminating at QEG 712, for H.263 QCIF codec video; and an RTP bearer path 718, originating at QEG 712 and terminating at UE B 710, for H.263 CIF codec video. QEG 712 provides processing to color balance and upgrade the video originating at UE A 702 and destined for UE B 710.

Figure 9:
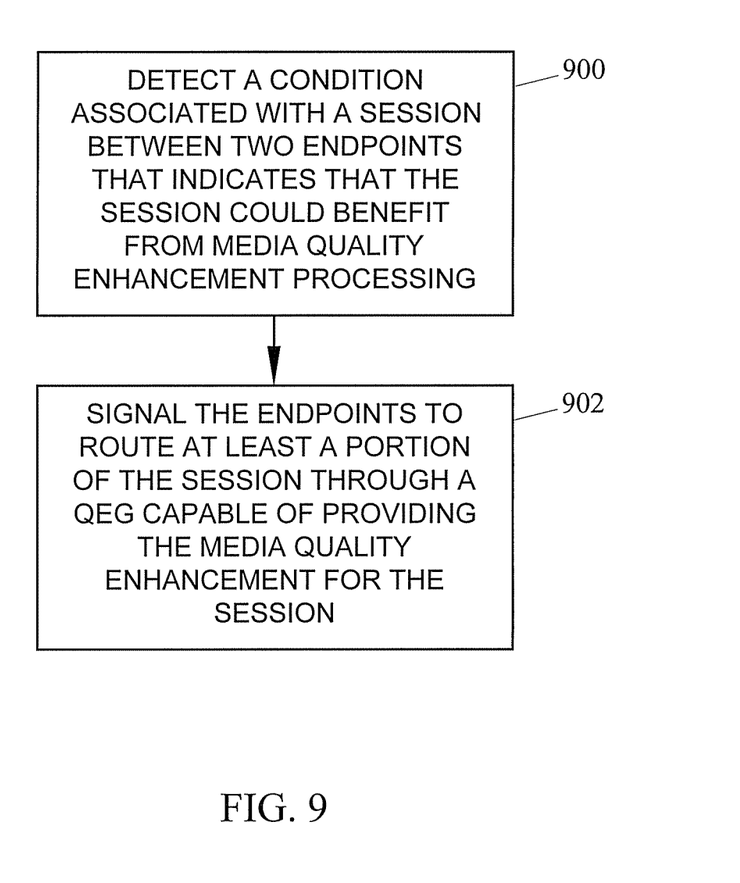
FIG. 9 is a flow chart illustrating exemplary overall steps for enhancing media quality by dynamically inserting a quality enhancement gateway according to an embodiment of the subject matter described herein.

FIG. 9 is a flow chart illustrating exemplary overall steps for enhancing media quality by dynamically inserting a quality enhancement gateway according to an embodiment of the subject matter described herein. Referring to FIG. 9, in step 900, the service node detects a condition associated with a session between two endpoints that indicates that the session could benefit from media quality enhancement processing. In step 902, the service node signals the endpoints to route at least a portion of the session through a quality enhancement gateway (QEG) capable of providing the media quality enhancement processing for the session.

Figure 10:
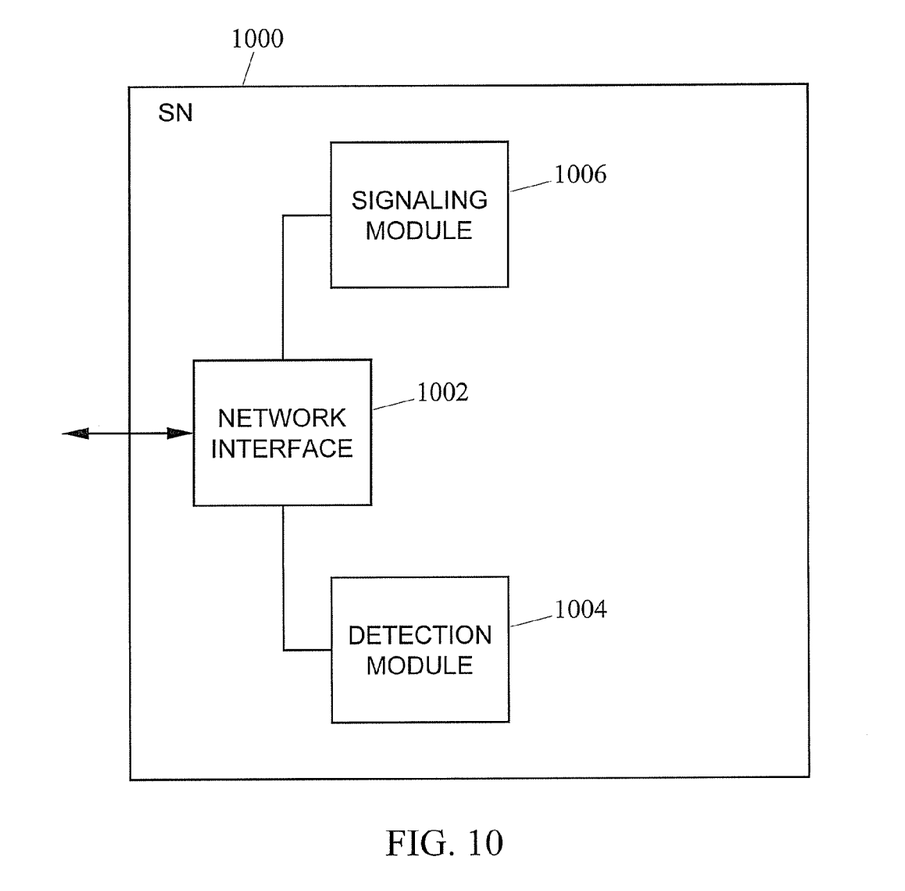
FIG. 10 is a block diagram of an exemplary service node according to an embodiment of the subject matter described herein.

FIG. 10 is a block diagram of an exemplary service node according to an embodiment of the subject matter described herein. Referring to FIG. 10, service node 1000 includes a network interface 1002 for sending and receiving messages associated with a session. Network interface 1002 may be capable of sending and receiving messages according to any suitable protocol, such as session initiation protocol (SIP) signaling or extensible messaging and presence protocol (XMPP) signaling. Service node 1000 includes a detection module 1004 for detecting a condition associated with a session between two endpoints that indicates that the session could benefit from media quality enhancement processing. Service node 1000 further includes a signaling module 1006 for signaling the endpoints to route at least a portion of the session through a quality enhancement gateway (QEG) capable of providing the media quality enhancement for the session.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method, comprising:
identifying, at a service node, a first Session Initiation Protocol (SIP) invite message sent by a first endpoint to a second endpoint to initiate a session between the first and second endpoints, wherein the session includes a video portion, wherein the first SIP invite message passes through the service node and specifies a first codec for the video portion, wherein the first and second endpoints are configured to communicate over a first bearer path that bypasses a quality enhancement gateway (QEG), and wherein the first bearer path is entirely within a packet network distinct from a public switched telephone network (PSTN);
detecting, by the service node, that the second endpoint supports a second codec; and
in response to the detection:
signaling the QEG, by the service node, to obtain port information required to route the video portion of the session through the QEG, wherein the QEG is configured to signal the service node to establish a second bearer path between the first endpoint and the QEG and a third bearer path between the second endpoint and the QEG;
sending to the second endpoint by the service node, a second SIP invite message specifying the second codec for receiving the video portion and the first codec for sending the video portion;
receiving, at the service node from the second endpoint, a first SIP ringing message specifying the second codec for sending the video portion and the first codec for receiving the video portion;
sending, by the service node to the first endpoint, a second SIP ringing message specifying the first codec for sending and receiving the video portion; and
signaling the QEG, by the service node, to set processing options for the session, wherein the QEG is configured to provide media quality enhancement processing for the video portion of the session, wherein the first bearer path originates at the second endpoint and terminates at the first endpoint for communicating the video portion using the first codec, wherein the second bearer path originates at the first endpoint and terminates at the QEG for communicating the video portion using the first codec, and wherein the third bearer path originates at the QEG and terminates at the second endpoint for communicating the video portion using the second codec, and wherein the second and third bearer paths are entirely within the packet network.

2. The method of claim 1, wherein the service node is a stand-alone node or a component of a call server/softswitch.

3. The method of claim 1, wherein the service node is configured to operate in a network in which the session neither originates nor terminates.

4. The method of claim 1, wherein the service node is configured as an internet protocol multimedia subsystem (IMS) application server (AS), a media resource function controller (MRFC), or a call session control function (CSCF).

5. The method of claim 1, wherein the signaling comprises session initiation protocol (SIP) signaling or extensible messaging and presence protocol (XMPP) signaling.

6. The method of claim 1, wherein detecting includes detecting a wireless endpoint.

7. The method of claim 1, wherein the first codec is a quarter common intermediate format (QCIF) codec and wherein the second codec is a common intermediate format (CIF) codec.

8. The method of claim 7, wherein the processing option includes color balancing the video portion encoded with the QCIF codec.

9. The method of claim 1, wherein the session includes an audio portion communicated over the first bearer path.

10. The method of claim 1, wherein the media quality enhancement processing includes at least one of: video blocking reduction, video frame interpolation, video line interpolation, video motion interpolation, or two-dimensional (2D) video to three-dimensional (3D) video simulation.

11. The method of claim 1, wherein the service node applies a policy to determine what, if any, signaling should be performed.

12. The method of claim 11, wherein the policy is at least one of a network policy, a user policy, a user-configuration policy, a session-specific policy, an operator policy, a service provider policy, a codec-specific policy, a route-specific policy, or a media-specific policy.

13. A service node, comprising:
a processor; and
a memory coupled to the processor, the memory having program instructions stored thereon that, upon execution by the processor, cause the service node to:
identify a first Session Initiation Protocol (SIP) message sent by a first endpoint to a second endpoint to initiate a session between the first and second endpoints, wherein the session includes a video portion, wherein the first SIP invite message specifies a first codec for the video portion, wherein the first and second endpoints are configured to communicate over a first bearer path that bypasses a quality enhancement gateway (QEG), and wherein the first bearer path is entirely within a packet network distinct from a public switched telephone network (PSTN);
detect that the second endpoint supports a second codec; and
in response to the detection:
signal the QEG to obtain port information required to route the video portion of the session through the QEG, wherein the QEG is configured to signal the service node to establish a second bearer path between the first endpoint and the QEG and a third bearer path between the second endpoint and the QEG;
send to the second endpoint, a second SIP invite message specifying the second codec for receiving the video portion and the first codec for sending the video portion;
receive, from the second endpoint, a first SIP ringing message specifying the second codec for sending the video portion and the first codec for receiving the video portion;
send, to the first endpoint, a second SIP ringing message specifying the first codec for sending and receiving the video portion; and
signaling the QEG to set processing options for the session, wherein the QEG is configured to provide media quality enhancement processing for the video portion of the session, wherein the first bearer path originates at the second endpoint and terminates at the first endpoint for communicating the video portion using the first codec, wherein the second bearer path originates at the first endpoint and terminates at the QEG for communicating the video portion using the first codec, wherein the third bearer path originates at the QEG and terminates at the second endpoint for communicating the video portion using the second codec, and wherein the second and third bearer paths are entirely within the packet network.

14. The service node of claim 13, wherein the service node is a stand-alone node or a component of a call server/softswitch.

15. The service node of claim 13, wherein the service node is configured to operate in a network in which the session originates, a network in which the session terminates, or a network in which the session neither originates nor terminates.

16. The service node of claim 13, wherein the service node is configured as an internet protocol multimedia subsystem (IMS) application server (AS), a media resource function controller (MRFC), or a call session control function (CSCF).

17. The service node of claim 13, wherein the signaling comprises session initiation protocol (SIP) signaling or extensible messaging and presence protocol (XMPP) signaling.

18. The service node of claim 13, wherein the first codec is a quarter common intermediate format (QCIF) codec and wherein the second codec is a common intermediate format (CIF) codec.

19. The service node of claim 18, wherein the processing option includes color balancing the video portion encoded with the QCIF codec.

20. The service node of claim 13, wherein the session includes an audio portion communicated over the first bearer path.

21. The service node of claim 13, wherein the media quality enhancement processing includes at least one of: video blocking reduction, video frame interpolation, video line interpolation, video motion interpolation, or two-dimensional (2D) video to three-dimensional (3D) video simulation.

22. The service node of claim 13, wherein the service node applies a policy to determine what, if any, signaling should be performed.

23. The service node of claim 22, wherein the policy is at least one of: a network policy, a user policy, a user-configuration policy, a session-specific policy, an operator policy, a service provider policy, a codec-specific policy, a route-specific policy, or a media-specific policy.

24. A non-transitory computer readable medium comprising computer executable instructions that when executed by a processor of a service node, causes the service node to:

identify a first Session Initiation Protocol (SIP) invite message sent by a first endpoint to a second endpoint to initiate a session between the first and second endpoints, wherein the session includes a video portion, wherein the first SIP invite message passes through the service node and specifies a first codec for the video portion, wherein the first and second endpoints are configured to communicate over a first bearer path that bypasses a quality enhancement gateway (QEG), and wherein the first bearer path is entirely within a packet network distinct from a public switched telephone network (PSTN);

detect that the second endpoint supports a second codec; and in response to the detection:

signal the QEG to obtain port information required to route the video portion of the session through the QEG, wherein the QEG is configured to signal the service node to establish a second bearer path between the first endpoint and the QEG and a third bearer path between the second endpoint and the QEG;

send to the second endpoint a second SIP invite message specifying the second codec for receiving the video portion and the first codec for sending the video portion;

receive, from the second endpoint, a first SIP ringing message specifying the second codec for sending the video portion and the first codec for receiving the video portion;

sending, to the first endpoint, a second SIP ringing message specifying the first codec for sending and receiving the video portion; and signaling the QEG to set processing options for the session, wherein the QEG is configured to provide media quality enhancement processing for the video portion of the session, wherein the first bearer path originates at the second endpoint and terminates at the first endpoint for communicating the video portion using the first codec, wherein the second bearer path originates at the first endpoint and terminates at the QEG for communicating the video portion using the first codec, wherein the third bearer path originates at the QEG and terminates at the second endpoint for communicating the video portion using the second codec, and wherein the second and third bearer paths are entirely within the packet network.

* * * * *